(12) United States Patent
Joo et al.

(10) Patent No.: US 11,999,501 B2
(45) Date of Patent: Jun. 4, 2024

(54) EXHAUST DUCT ASSEMBLY AND AIRCRAFT INCLUDING THE SAME

(71) Applicants: PRATT & WHITNEY CANADA CORP., Longueuil (CA); HANWHA AEROSPACE CO., LTD., Gyeongsangnam-do (KR)

(72) Inventors: Young Jung Joo, Changwon-si (KR); Guy Lefebvre, Saint-Bruno-de-Montarville (CA); Jacob Biernat, LaSalle (CA)

(73) Assignees: HANWHA AEROSPACE CO., LTD., Gyeongsangnam-Do (KR); PRATT & WHITNEY CANADA CORP., Loungueuil (CA)

( * ) Notice: Subject to any disclaimer, the term of this patent is extended or adjusted under 35 U.S.C. 154(b) by 0 days.

(21) Appl. No.: 18/247,083

(22) PCT Filed: Oct. 27, 2020

(86) PCT No.: PCT/KR2020/014691
§ 371 (c)(1),
(2) Date: Mar. 29, 2023

(87) PCT Pub. No.: WO2022/080546
PCT Pub. Date: Apr. 21, 2022

(65) Prior Publication Data
US 2023/0406525 A1  Dec. 21, 2023

(30) Foreign Application Priority Data

Oct. 14, 2020  (KR) .................. 10-2020-0132986

(51) Int. Cl.
*B64D 33/04* (2006.01)
*F01D 25/30* (2006.01)

(52) U.S. Cl.
CPC ............. *B64D 33/04* (2013.01); *F01D 25/30* (2013.01); *F05D 2220/323* (2013.01)

(58) Field of Classification Search
CPC ... B64D 33/04; F01D 25/30; F05D 2220/323; F02K 1/40; F02K 1/805; F16J 15/3268; F16J 3/046
See application file for complete search history.

(56) References Cited

U.S. PATENT DOCUMENTS

| 5,297,928 A | 3/1994 | Imakiire et al. | |
| 2018/0298811 A1 | 10/2018 | Tanigaki | |
| 2021/0172528 A1* | 6/2021 | Ruggeri | F16J 15/363 |

FOREIGN PATENT DOCUMENTS

| JP | 2016023641 A | 2/2016 |
| KR | 1020130143018 A | 12/2013 |
| KR | 1020160130496 A | 11/2016 |

OTHER PUBLICATIONS

See Pub., PT6T-3/6 Training Manual (2001), Pratt & Whitney Canada, (Year: 2001).*

(Continued)

*Primary Examiner* — Jason H Duger
(74) *Attorney, Agent, or Firm* — NORTON ROSE FULBRIGHT CANADA LLP (57) ABSTRACT

An aircraft has an exhaust duct assembly disposed in a low-pressure turbine portion of a gas turbine engine to discharge exhaust gas to the outside and includes a duct having an inlet through which an exhaust gas is introduced, an exhaust portion through which the exhaust gas is exhausted, and a mounting bore formed therethrough; a duct housing in which the duct is disposed therein, and including a mounting hole into which the exhaust portion is inserted; a shaft housing disposed inside the mounting bore, inserted into the duct housing so that one end thereof faces the inlet of the duct, and having a driving axis of the low-pressure (Continued)

turbine portion disposed therein; and a sealing portion having a ring shape, being coupled to one end of the shaft housing, and maintaining airtightness between the driving axis and the shaft housing.

8 Claims, 6 Drawing Sheets

(56) References Cited

OTHER PUBLICATIONS

Translation of ISR issued in counterpart PCT application No. PCT/KR2020/014691.

* cited by examiner

EXHAUST DUCT ASSEMBLY AND AIRCRAFT INCLUDING THE SAME

TECHNICAL FIELD

The present disclosure relates to an exhaust duct assembly and an aircraft including the same, and more particularly, to an exhaust duct assembly disposed in a low-pressure turbine part and an aircraft including the exhaust duct assembly.

BACKGROUND

An exhaust duct is included in a turbo-prop engine, a turbo-fan engine, or a turbo-shaft engine of an aircraft, and exhausts an exhaust gas passing through a turbine to the outside. The exhaust duct is disposed at the rear of a low-pressure turbine (a power turbine) with respect to a movement direction of the exhaust gas. The exhaust gas passing through the low-pressure turbine is exhausted to the outside while passing through the exhaust duct.

As exhaust gas of high temperature and high pressure passes directly through the exhaust duct, the exhaust duct receives a combination of a mechanical load and a thermal load. Therefore, the exhaust duct needs to have a high level of structural stability, and in particular, the exhaust duct is required to satisfy stress conditions under high temperature and high pressure conditions.

A power turbine shaft connected to a power shaft of a gas turbine engine is inserted into the exhaust duct. The power turbine shaft is disposed inside a power turbine shaft housing, and the power turbine shaft housing is connected to another member of the gas turbine engine. In this regard, a carbon seal cover for sealing the inside and outside of the power turbine shaft housing may be used.

In the related art, the carbon seal cover is welded to the end of the power turbine shaft housing. In such a structure, because a welding operation must be performed inside the power turbine shaft due to the shape of the power turbine shaft housing and the carbon seal cover, workability is reduced and a welding confirmation operation is not easy. In addition, the weight is inevitably increased by separately forming a rope seal seating surface at the end of the power turbine shaft housing.

In particular, because the rope seal seating surface connected to a gas path of the exhaust duct is a part where a hot gas comes into contact, and the power turbine shaft housing is a part of a relatively low temperature, a very large thermal gradient is formed in the carbon seal cover disposed therebetween, and thus, thermal separation is not performed properly.

Accordingly, there is a problem in that excessive thermal stress is applied to the carbon seal cover, a temperature deviation is severe for each part, and the lifespan is reduced.

The above-described background is technical information that the inventor possessed to develop the present disclosure or acquired in a process of developing the present disclosure, and may not necessarily be a known technology disclosed to the general public prior to the filing of the present disclosure.

SUMMARY

According to one aspect, the present disclosure provides an exhaust duct assembly in which a rope seal seating surface is included in a carbon seal cover and configured as a member, and the member is bolt-coupled to the end of a shaft housing, whereby the concentration of local thermal stress is minimized, a temperature deviation is reduced, and lifespan is increased, and an aircraft including the exhaust duct assembly.

According to an embodiment of the present disclosure, an exhaust duct assembly disposed in a low-pressure turbine portion of a gas turbine engine to discharge exhaust gas to the outside includes a duct including an inlet through which an exhaust gas is introduced, an exhaust portion through which the exhaust gas is exhausted, and a mounting bore formed by passing therethrough; a duct housing in which the duct is disposed therein, and including a mounting hole into which the exhaust portion is inserted; a shaft housing disposed inside the mounting bore, inserted into the duct housing so that one end thereof faces the inlet of the duct, and having a driving axis of the low-pressure turbine portion disposed therein; and a sealing portion having a ring shape coupled to one end of the shaft housing and maintaining airtightness between the driving axis and the shaft housing.

The shaft housing may include a protruding portion and a seating portion disposed on the one end and forming a step, and the sealing portion may be fastened onto the seating portion.

The sealing portion may include a main body of a ring shape; a plurality of sealing guides arranged side by side in a longitudinal direction of the main body on an outer circumferential surface of the main body; and a fastening member disposed on an inner circumferential surface of the main body and fastened to the seating portion.

The fastening member may include a plurality of fasteners spaced apart from each other at predetermined intervals along a circumference of the main body.

The main body may protrude toward the shaft housing and extend in a state in which the fastening member is fastened onto the seating portion, wherein a part that protrudes is spaced apart from an outer circumferential surface of the shaft housing.

According to another embodiment of the present disclosure, an aircraft includes a gas turbine engine and an exhaust duct assembly disposed in a low-pressure turbine portion of the gas turbine engine to discharge exhaust gas to the outside, wherein the exhaust duct assembly includes a duct including an inlet through which the exhaust gas is introduced, an exhaust portion through which the exhaust gas is exhausted, and a mounting bore formed by passing therethrough; a duct housing in which the duct is disposed therein, and including a mounting hole into which the exhaust portion is inserted; a shaft housing disposed inside the mounting bore, inserted into the duct housing so that one end thereof faces the inlet of the duct, and having a driving axis of the low-pressure turbine portion disposed therein; and a sealing portion of a ring shape coupled to one end of the shaft housing and maintaining airtightness between the driving axis and the shaft housing.

Other aspects, features, and advantages other than those described above will become apparent from the following detailed description, claims and drawings for embodying the disclosure.

The exhaust duct assembly and the aircraft including the same according to an embodiment of the present disclosure may eliminate local thermal stress concentration applied to the exhaust duct assembly and reduce the temperature deviation between components of the exhaust duct assembly, and thus the lifespan of the exhaust duct assembly may be increased.

In addition, the exhaust duct assembly and the aircraft including the same according to an embodiment of the present disclosure may reduce the number of components and weight compared to the airtight maintenance member of the related art.

DETAILED DESCRIPTION

According to an embodiment of the present disclosure, an exhaust duct assembly disposed in a low-pressure turbine portion of a gas turbine engine to discharge exhaust gas to the outside includes a duct including an inlet through which an exhaust gas is introduced, an exhaust portion through which the exhaust gas is exhausted, and a mounting bore formed by passing therethrough; a duct housing in which the duct is disposed therein, and including a mounting hole into which the exhaust portion is inserted; a shaft housing disposed inside the mounting bore, inserted into the duct housing so that one end thereof faces the inlet of the duct, and having a driving axis of the low-pressure turbine portion disposed therein; and a sealing portion having a ring shape coupled to one end of the shaft housing and maintaining airtightness between the driving axis and the shaft housing.

Since the present disclosure may apply various modifications and have various embodiments, specific embodiments are illustrated with reference to the drawings and will be described in detail. However, this is not intended to limit the present disclosure to specific embodiments, and should be understood to include all modifications, equivalents and substitutes included in the spirit and scope of the present disclosure. In the description of the present disclosure, even though illustrated in other embodiments, like reference numerals refer to like components.

Hereinafter, embodiments of the present disclosure will be described in detail with reference to the accompanying drawings, and when describing with reference to the drawings, the same or corresponding constituent elements are given the same reference numerals, and redundant descriptions thereof will be omitted.

In the following embodiments, terms such as first and second are not used in a limiting meaning, but for the purpose of distinguishing one component from another component.

In the following examples, the singular expression includes the plural expression unless the context clearly indicates otherwise.

In the following embodiments, terms such as include or have means that the features or elements described in the specification are present, and do not preclude the possibility of adding one or more other features or elements in advance.

In the drawings, components may be exaggerated or reduced in size for convenience of description. For example, the size and thickness of each component shown in the drawings are arbitrarily shown for convenience of description, and thus the present disclosure is not necessarily limited to what is shown.

In the following embodiments, the x-axis, the y-axis, and the z-axis are not limited to three axes on a Cartesian coordinate system, and may be interpreted in a broad sense including them. For example, the x-axis, y-axis, and z-axis may be orthogonal to each other, but may refer to different directions that are not orthogonal to each other.

When a certain embodiment may be implemented differently, a specific process order may be performed differently from the described order. For example, two processes described in succession may be performed substantially simultaneously, or may be performed in an order opposite to the described order.

The terms used in the present application are used only to describe specific embodiments, and are not intended to limit the present disclosure. In this specification, the term "include," "comprise," "including," or "comprising," specifies a property, a region, a fixed number, a step, a process, an element and/or a component but does not exclude other properties, regions, fixed numbers, steps, processes, elements and/or components.

Figure 1:
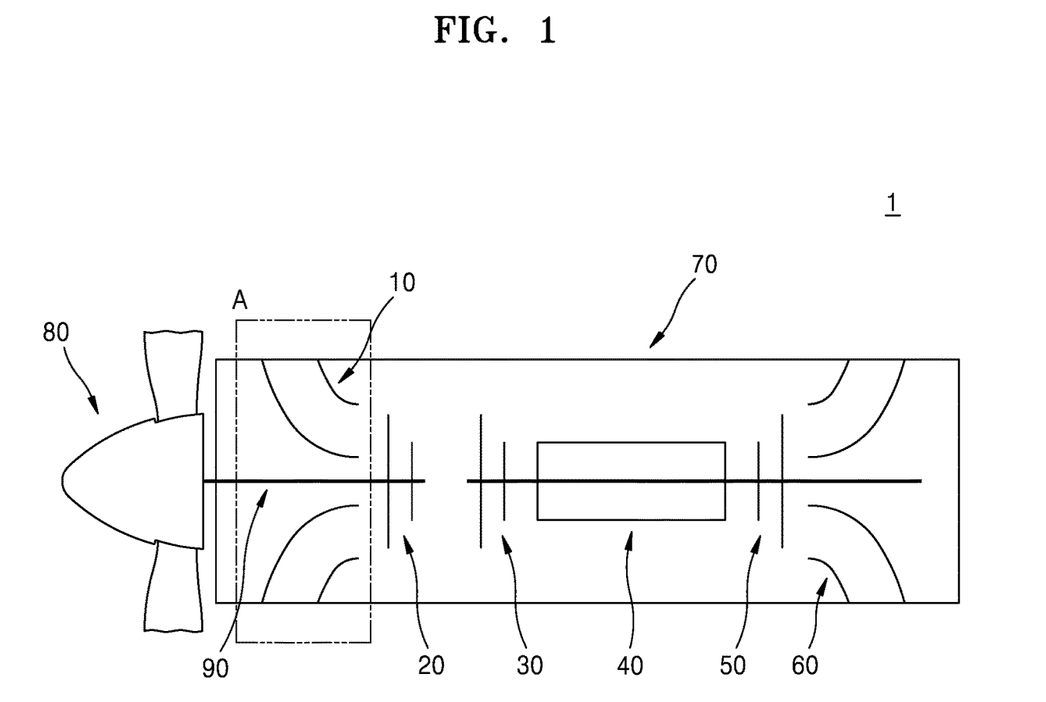
FIG. 1 shows an exhaust duct assembly and an engine including the same according to an embodiment of the present disclosure.

FIG. 1 shows an exhaust duct assembly 10 and an engine 1 including the same according to an embodiment of the present disclosure.

Referring to FIG. 1, the exhaust duct assembly 10 according to an embodiment of the present disclosure may be included in the engine 1 of an aircraft (not shown). For example, the engine 1 may be a turbo-prop engine of the aircraft. The engine 1 may include the exhaust duct assembly 10, a low-pressure turbine (power turbine) 20, a high-pressure turbine 30, a combustor 40, a compressor 50, an intake duct 60, a nacelle 70, and a propeller 80.

First, an external air introduced into the nacelle 70 through the intake duct 60 may pass through the compressor 50 and the combustor 40 to be in a state of high temperature and high pressure. Next, the external air may be expanded through the high-pressure turbine 30 and then supplied to the low-pressure turbine 20. The low-pressure turbine 20 may be driven by the supplied external air and thus the propeller 80 connected to the low-pressure turbine 20 through a driving axis may be rotated. Then, the external air exiting the low-pressure turbine 20 may be exhausted outside through the exhaust duct assembly 10.

The exhaust duct assembly 10 may be arranged in the nacelle 70 to exhaust to the outside the exhaust air that has passed through the low-pressure turbine 20. That is, the exhaust duct assembly 10 may be disposed in a low-pressure turbine portion of the engine 1. In an embodiment, a part of the driving axis 90 and/or the low-pressure turbine 20 may be disposed inside the exhaust duct assembly 10.

The type of the aircraft including the exhaust duct assembly 10 and the engine 1 is not particularly limited. The vehicle may be an unmanned or manned aircraft.

Figure 2:
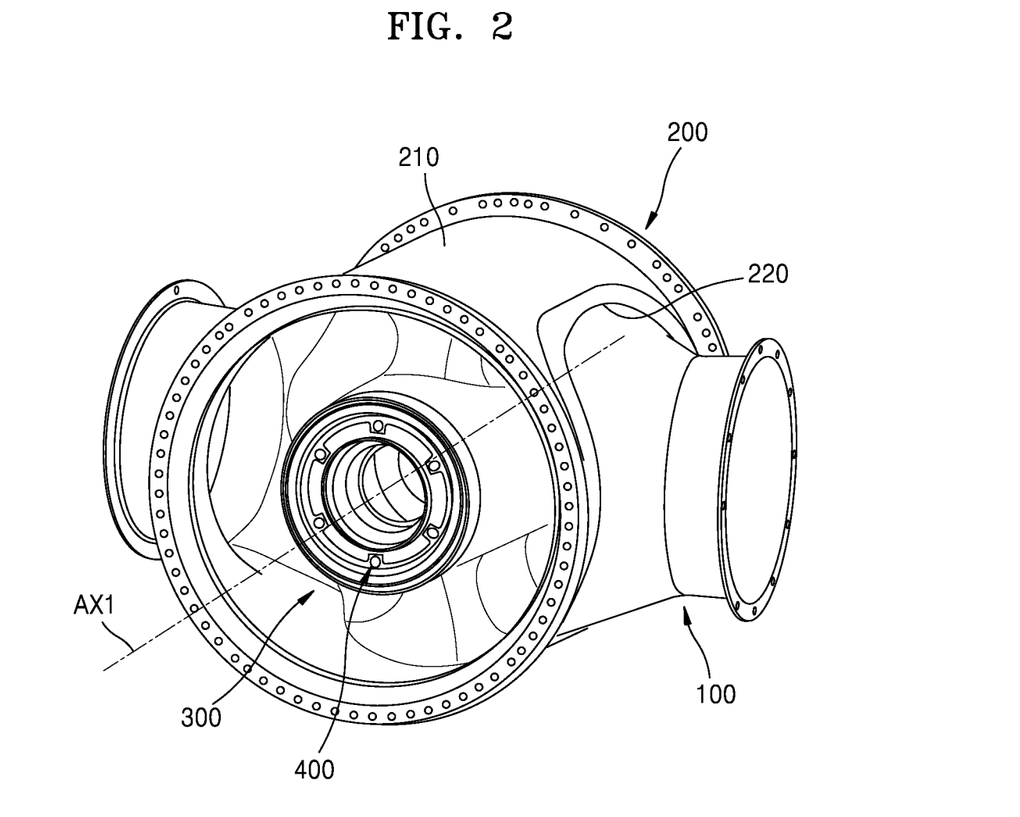
FIG. 2 shows the exhaust duct assembly of FIG. 1.
Figure 3:
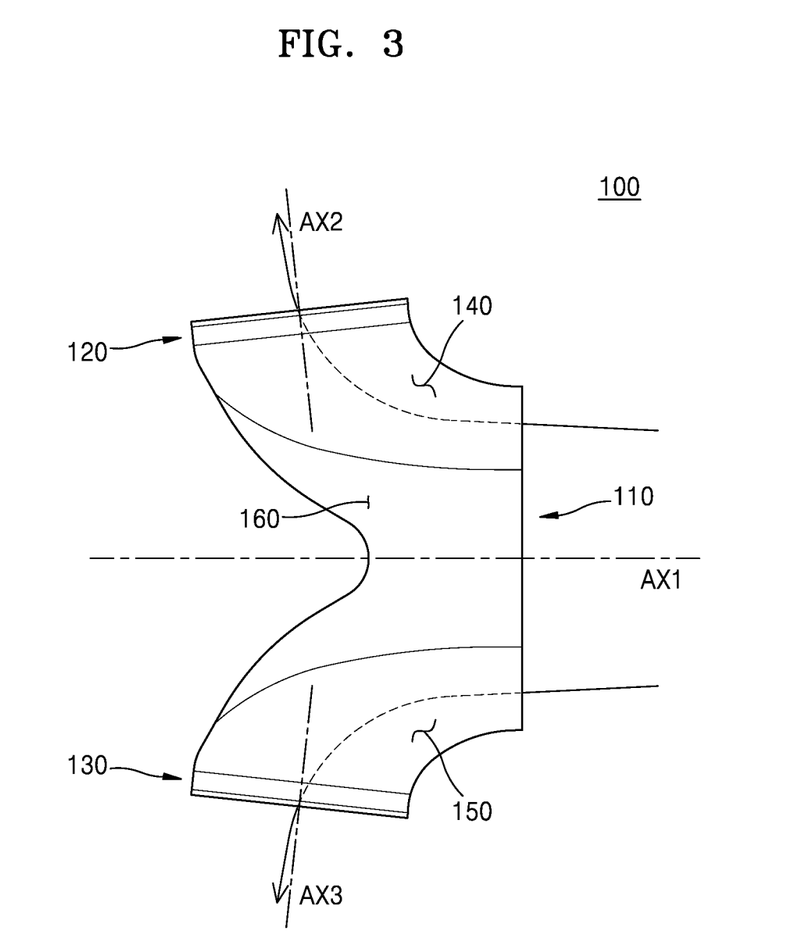
FIG. 3 shows the exhaust duct of FIG. 2.
Figure 4:
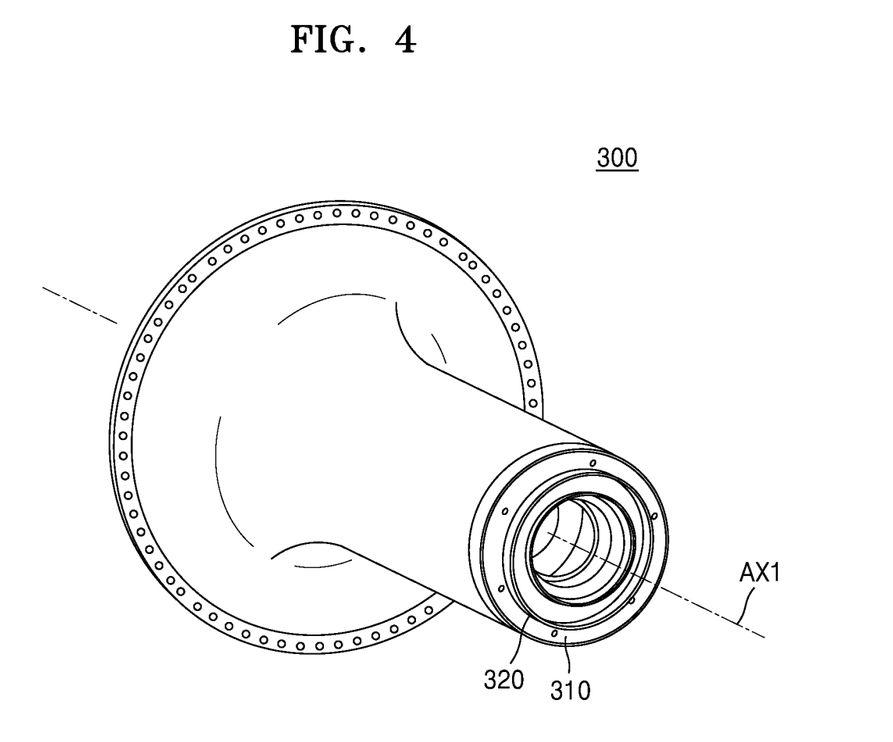
FIG. 4 shows a shaft housing of FIG. 2.
Figure 5:
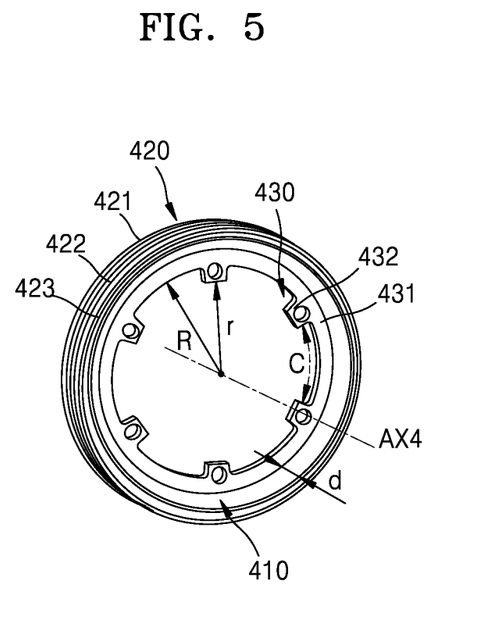
FIG. 5 shows a sealing portion of FIG. 2.
Figure 6:
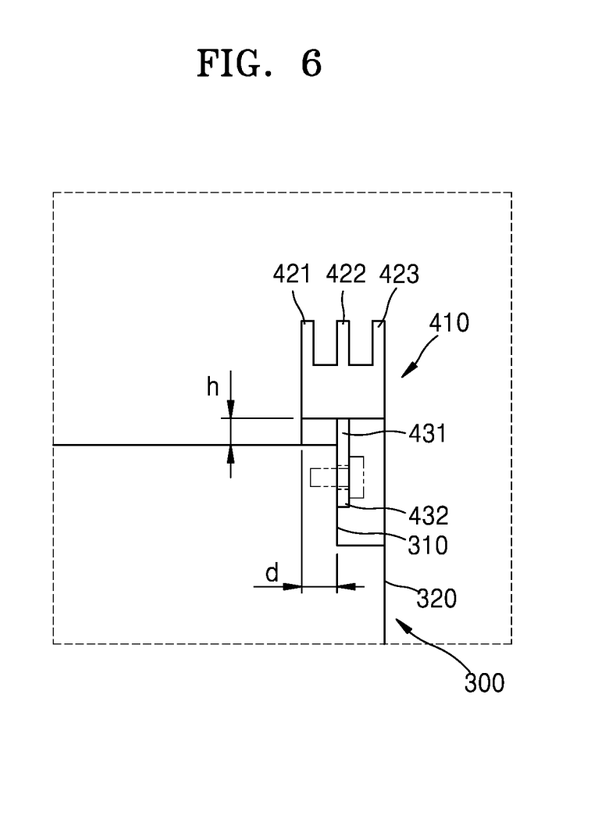
FIG. 6 shows a cross-section illustrating how the shaft housing and the sealing portion are combined according to an embodiment of the present disclosure.

FIG. 2 shows the exhaust duct assembly 10 of FIG. 1, FIG. 3 shows an exhaust duct 100 of FIG. 2, FIG. 4 shows a shaft housing 300 of FIG. 2, FIG. 5 shows a sealing portion 400 of FIG. 2, and FIG. 6 shows a cross-section illustrating how the shaft housing 300 and the sealing portion 400 are combined according to an embodiment of the present disclosure.

Referring to FIGS. 2 to 5, the exhaust duct assembly 10 according to an embodiment of the present disclosure may include the exhaust duct 100, the duct housing 200, the shaft housing 300, and the sealing portion 400.

The exhaust duct 100 may be disposed inside the duct housing 200 which will be described below, and may include a flow path through which the exhaust gas passed through the low-pressure turbine 20 is exhausted to the outside. The exhaust gas passed through the low-pressure turbine 20 may be introduced into the exhaust duct 100 and exhausted to the outside. In an embodiment, the exhaust duct 100 may have a symmetrical shape with respect to a central axis AX1. Here, the central axis AX1 may be a central axis of the exhaust duct 100 and/or the exhaust duct assembly 10.

In an embodiment, as shown in FIG. 3, the exhaust duct 100 may include an inlet 110, a first exhaust port 120, a second exhaust port 130, a first flow path 140, and a second flow path 150 and a mounting bore 160.

The inlet 110 may be disposed to face the low-pressure turbine 20, so that exhaust gas passed through the low-pressure turbine 20 may be introduced. The exhaust gas introduced into the inlet 110 may flow to each of the first exhaust port 120 and the second exhaust port 130. In an embodiment, the inlet 110 may have a ring shape.

The first exhaust port 120 may be formed to extend from the inlet 110 to one side. In an embodiment, the first exhaust port 120 may be circular. In addition, the first exhaust port 120 may have a central axis AX2.

The second exhaust port 130 may be formed to extend from the inlet 110 to the other side. In an embodiment, the second exhaust port 130 may be circular. In addition, the second exhaust port 130 may have a central axis AX3.

In an embodiment, as shown in FIG. 3, lines extending the central axis AX2 of the first exhaust port 120 and the central axis AX3 of the second exhaust port 130 may be arranged to cross each other. That is, the central axis AX2 and the central axis AX3 may be disposed not to be parallel to each other.

In an embodiment, as shown in FIG. 3, the exhaust duct 100 may have a Y-shape. More specifically, the first exhaust port 120 and the second exhaust port 130 of the exhaust duct 100 may extend in different directions in one inlet 110. In addition, the exhaust duct 100 may have a shape in which a part opposite to the inlet 110 is recessed toward the inlet 110, and may generally have the Y-shape when viewed from the top.

The first flow path 140 may be an internal space partitioned between the inlet 110 and the first exhaust port 120. Part of the exhaust gas introduced into the inlet 110 may pass through the first flow path 140 and be exhausted to the outside through the first exhaust port 120 (an upward arrow in FIG. 3).

The second flow path 150 may be an internal space partitioned between the inlet 110 and the second exhaust port 130. The remaining part of the exhaust gas introduced into the inlet 110 may pass through the second flow path 150 and be exhausted to the outside through the second exhaust port 130 (a downward arrow in FIG. 3).

In an embodiment, the exhaust duct 100 may further include a splitter (not shown). The splitter may be disposed inside the recessed part of the exhaust duct 100, and may collide with the exhaust gas introduced into the inlet 110. The exhaust gas colliding with the splitter may move to each of the first flow path 140 and the second flow path 150, and may be exhausted through the first exhaust port 120 and the second exhaust port 130.

The mounting bore 160 may be an internal space formed through in the direction of the central axis AX1, and partitioned by an inner surface of the exhaust duct 100. The mounting bore 160 may have the same central axis AX1 as that of the exhaust duct 100. The shaft housing 300 which will be described below may be disposed inside the mounting bore 160.

FIG. 3 shows that the exhaust duct 100 is a dual exhaust duct including two exhaust ports, but is not limited thereto. The number of inlets and outlets may vary depending on conditions.

Referring to FIG. 2, the duct housing 200 may include an internal space such that the exhaust duct 100 is disposed therein. For example, the duct housing 200 may have a hollow cylindrical shape, and include the inner surface disposed to cover at least a part of an outer surface of the exhaust duct 100. The duct housing 200 may fix the exhaust duct assembly 10 to one side of the nacelle 70, and may prevent the exhaust duct assembly 10 from interfering with or colliding with other members.

In an embodiment, the duct housing 200 may include a body 210 and a mounting hole 220.

The body 210 may include an internal space in which the exhaust duct 100 is disposed, and may have a cylindrical shape in an embodiment. The body 210 may be formed integrally or may be formed by coupling a plurality of segments. For example, the body 210 may be formed by coupling parts divided by a predetermined number in a circumferential direction. However, hereinafter, for convenience of description, the embodiment in which the body 210 is formed integrally will be mainly described.

In an embodiment, a flange (not shown) may be disposed at both ends of the body 210 in the circumferential direction. The flange may include a plurality of through holes, through which the body 210 may be fastened or combined with other members.

The mounting hole 220 may be formed by cutting at least a part of both sides of the body 210 so that the first exhaust port 120 and the second exhaust port 130 of the exhaust duct 100 are respectively disposed. The shape and number of the mounting holes 220 is not particularly limited, and may correspond to the shape and number of exhaust portions to be inserted.

The shaft housing 300 may be a member housing and holding a shaft. For example, as shown in FIGS. 1 to 4, the shaft housing 300 may include a drive axis 90 of the low-pressure turbine 20 inserted therein, and be disposed in the mounting bore 160 of the exhaust duct 100. In an embodiment, the shaft housing 300 may include a cylindrical shape portion extending long in one direction, and a truncated cone shape portion extending therefrom, having a larger diameter than that of the cylindrical shape portion, and including a flange connectable to the nacelle 70 or other members. Accordingly, the shaft housing 300 may generally have a shape such as a funnel.

In an embodiment, in a state in which the shaft housing 300 is disposed inside the exhaust duct 100, one end of the shaft housing 300 (an end portion of the cylindrical shape portion) may be disposed inward than the inlet 110 of the exhaust duct 100. Through this, it is possible to secure a mounting space of the sealing portion 400 which will be described below, and to prevent the shaft housing 300 from interfering with the duct housing 200.

In an embodiment, the shaft housing 300 may include a seating portion 310 and a protruding portion 320.

The seating portion 310 may be positioned on an outer side of one end of the shaft housing 300 in a radial direction and include a seating surface on which the sealing portion 400 which will be described below is mounted. In an embodiment, the seating portion 310 may have the same central axis as the central axis AX1 of the exhaust duct 100.

The protruding portion 320 may be disposed inside the seating portion 310 in the radial direction. In an embodiment, the protruding portion 320 may be disposed to form a step with the seating portion 310. In addition, the protruding portion 320 may be disposed concentrically with the seating portion 310.

The sealing portion 400 may be disposed at one end of the shaft housing 300, and maintain airtight with the shaft housing 300, the drive axis 90 disposed inside the shaft housing 300, and the outside of the shaft housing 300.

In an embodiment, referring to FIGS. 2, 5 and 6, the sealing portion 400 may include a main body 410, a sealing guide 420, and a fastening member 430.

The main body 410 may be disposed on an inner circumference of the sealing portion 400 to support the sealing guide 420 and the fastening member 430. In an embodiment, the main body 410 may have a ring shape having a central axis AX4. Here, the central axis AX4 may be the same as the central axis AX1 of the exhaust duct 100.

The sealing guide 420 may be disposed on an outer circumference of the main body 410, and may maintain airtightness between inner and outer sides of the shaft housing 300.

In an embodiment, a plurality of sealing guides 420 may be arranged side by side in a longitudinal direction of the main body 410. More specifically, as shown in FIG. 5, the sealing guide 420 may include a first sealing guide 421, a second sealing guide 422, and a third sealing guide 423.

The first sealing guide 421 may be disposed at one end of the main body 410 in the circumferential direction. The second sealing guide 422 may be spaced apart from the first sealing guide 421 by a predetermined interval, and may be disposed in the circumferential direction of the main body 410 to be parallel with the first sealing guide 421. In addition, the third sealing guide 423 may be spaced apart from the second sealing guide 422 by a predetermined interval, and may be disposed in the circumferential direction of the main body 410 to be parallel with the second sealing guide 422. In addition, an O-ring may be disposed between the sealing guides 420.

The three sealing guides 420 are disposed in FIGS. 5 and 6, but the number of the sealing guides 420 is not particularly limited. In addition, intervals between the plurality of sealing guides 420 may be the same or different from each other.

Each of the first sealing guide 421 and the third sealing guide 423 is in contact with an end portion of the main body 410 in FIGS. 5 and 6, but the present disclosure is not limited thereto. For example, the first sealing guide 421 and/or the third sealing guide 423 may be disposed to be inwardly and/or outwardly spaced apart from the end portion of the main body 410.

The fastening member 430 may serve to fasten the sealing portion 400 to the shaft housing 300. The fastening member 430 may be disposed in the inner circumference of the main body 410.

In an embodiment, the fastening member 430 may include a mounting flange 431 and a fastener 432.

The mounting flange 431 may be disposed along the inner circumference of the main body 410 and may be inwardly spaced apart from the main body 410 by a predetermined interval d. As shown in FIG. 6, a part of the mounting flange 431 may be seated on the seating portion 310 of the shaft housing 300.

A plurality of fasteners 432 may be disposed along an inner circumference of the mounting flange 431. In an embodiment, the fasteners 432 may be spaced apart from the neighboring fasteners 432 by a preset interval C. The fastener 432 may be bolt-fastened to an insertion groove (not shown) formed in the seating portion 310 of the shaft housing 300.

That is, each fastener 432 may have a scallop shape by leaving only a minimal bolt fastening part, and removing surfaces positioned between a bolt and a bolt-fastened part.

As such, the sealing portion 400 according to an embodiment of the present disclosure is fastened through bolts rather than being welded to the shaft housing 300, thereby minimizing thermal deformation of the shaft housing 300 and the sealing portion 400 from affecting each other. In particular, it is possible to prevent the concentration of thermal stress in a coupling portion between the shaft housing 300 and the sealing portion 400.

In addition, it is possible to reduce the complexity of welding the shaft housing 300 and the sealing portion 400, and it is possible to prevent properties of the member from being changed and characteristics from being deteriorated due to a heat affected zone of welding.

In addition, the sealing portion 400 according to an embodiment of the present disclosure allows only a part of the mounting flange 431 and the fastener 432 to be mounted on the seating portion 310 of the shaft housing 300, thereby reducing the concentration of thermal stress according to a temperature change in the exhaust duct assembly 10.

In particular, the plurality of fasteners 432 are not arranged continuously in the circumferential direction of the sealing portion 400, but are spaced apart from each other by the preset interval C. That is, the plurality of fasteners 432 may be arranged to occupy only a part of the seating surface formed on the seating part 310, thereby minimizing the effect of thermal deformation of the shaft housing 300 on the sealing portion 400.

In addition, in the exhaust duct assembly 10 according to an embodiment of the present disclosure, the sealing portion 400 may be directly connected to the seating portion 310 of the shaft housing 300. That is, a member such as a separate rope seal for accommodating the sealing portion 400 is not disposed in the shaft housing 300, but the sealing portion 400 may be directly fastened to the shaft housing 300, and may simultaneously perform functions of the rope seal and a carbon seal cover.

Accordingly, the number and weight of the entire components may be reduced, and thermal separation between the shaft housing 300 and the sealing portion 400 may be more reliably performed.

In another embodiment, the sealing portion 400 may not include the mounting flange 431. That is, the plurality of fasteners 432 may be directly connected to the inner circumference of the main body 410 of the sealing portion 400.

Accordingly, the contact area between the seating portion 310 of the shaft housing 300 and the sealing portion 400 may be further reduced, thereby more reliably preventing thermal stress from being concentrated between the coupling portion of the shaft housing 300 and the sealing portion 400.

In an embodiment, as shown in FIG. 6, in a state in which the sealing portion 400 is mounted on the shaft housing 300, the main body 410 may be spaced apart from the outer peripheral surface of the shaft housing 300 by an interval h. In an embodiment, as shown in FIG. 6, in a state in which the sealing portion 400 is mounted on the shaft housing 300, the fastener 432 may be spaced apart from the protruding portion 320.

Accordingly, the effect of the thermal deformation of the shaft housing 300 on the sealing portion 400 may be further reduced.

The exhaust duct assembly and the aircraft including the same according to an embodiment of the present disclosure may improve workability (assembly and/or inspection, etc.) by changing the shape of the shaft housing to a bolt fastening structure in order to solve the problems of the prior art described above. In addition, it is possible to reduce the weight by reflecting the rope seal seating surface to the carbon seal structure.

The exhaust duct assembly and the aircraft including the same according to an embodiment of the present disclosure may have a scallop shape by leaving only the minimal bolt-fastened part and removing the surfaces positioned between the bolt and the bolt-fastened part, thereby reducing the temperature and stress of the exhaust duct assembly and increasing the lifespan.

As described above, the present disclosure has been described with reference to the embodiment shown in the drawings, but this is only an example. Those of ordinary skill in the art may fully understand that various modifications and equivalent other embodiments are possible from the embodiments. Therefore, the true technical protection scope of the present disclosure should be determined based on the appended claims.

Specific technical content described in the embodiment is an embodiment and does not limit the technical scope of the embodiment. In order to concisely and clearly describe the description of the invention, descriptions of conventional general techniques and configurations may be omitted. In addition, the connection or connection members of lines between the components shown in the drawings are illustrative of functional connections and/or physical or circuit connections, and may be represented as a variety of functional connections, physical connections, or circuit connections that are replaceable or additional in an actual device. In addition, if there is no specific mention such as "essential" or "importantly", it may not be an essential component for the application of the present disclosure.

In the description of the invention and in the claims, "above" or similar referents may refer to both the singular and the plural unless otherwise specified. In addition, when a range is described in the embodiment, it includes the invention to which individual values within the range are applied (unless there is a description to the contrary), and each individual value constituting the range is described in the description of the invention. In addition, the steps constituting the method according to the embodiment may be performed in an appropriate order unless the order is explicitly stated or there is no description to the contrary. The embodiments are not necessarily limited according to the order of description of the above steps. The use of all examples or illustrative terms (e.g., and the like) in the embodiment is merely for the purpose of describing the embodiment in detail, and unless limited by the claims, the scope of the embodiments is not limited by the above examples or exemplary terms. In addition, those skilled in the art will appreciate that various modifications, combinations, and changes may be made in accordance with design conditions and factors within the scope of the appended claims or their equivalents.

EXPLANATION OF REFERENCE NUMERALS

1: engine
10: exhaust duct assembly
100: exhaust duct
200: duct housing
300: shaft housing
400: sealing portion

INDUSTRIAL APPLICABILITY

The exhaust duct assembly and the aircraft including the same according to an embodiment of the present disclosure may eliminate local thermal stress concentration applied to the exhaust duct assembly and reduce the temperature deviation between components of the exhaust duct assembly, and thus the lifespan of the exhaust duct assembly may be increased and used in related industrial fields.

The invention claimed is:

1. An exhaust duct assembly disposed in a low-pressure turbine portion of a gas turbine engine to discharge an exhaust gas to the outside, the exhaust duct assembly comprising:
   a duct comprising an inlet through which the exhaust gas is introduced, an exhaust portion through which the exhaust gas is exhausted, and a mounting bore formed therethrough;
   a duct housing in which the duct is disposed therein, and comprising a mounting hole into which the exhaust portion is inserted;
   a shaft housing disposed inside the mounting bore of the duct, inserted into the duct housing so that a first end thereof faces the inlet of the duct, and having a driving axis of the low-pressure turbine portion disposed therein, the shaft housing having a second end opposite the first end and defining an axially facing annular seat around the driving axis; and
   a sealing portion having a ring shape, being coupled to the second end of the shaft housing, and maintaining airtightness between inner and outer sides of the shaft housing;
   wherein the sealing portion has a main ring body and a plurality of mounting tabs projecting radially inwardly from an inner circumferential surface of the main ring body, the circumferentially interrupted points of contact with the axially facing annular seat of the shaft housing, and
   wherein bolts extend through the plurality of mounting tabs for bolting the sealing portion to the axially facing annular seat of the shaft housing.

2. The exhaust duct assembly of claim 1,
   wherein the shaft housing comprises an annular protruding portion extending axially from the second end, the annular protruding portion having a radially outer diameter surface, and wherein the axially facing annular seat extends circumferentially around the annular protruding portion, the radially outer diameter surface of the annular protruding portion and the axially facing surface forming a step, and
   wherein the main ring body of the sealing portion is spaced radially outwardly from the radially outer diameter surface of the annular protruding portion.

3. The exhaust duct assembly of claim 2, wherein the sealing portion comprises
   a plurality of sealing guides arranged side by side in a longitudinal direction of the main ring body on an outer circumferential surface of the main ring body, each of the sealing guides extending circumferentially around the driving axis.

4. The exhaust duct assembly of claim 3, wherein the inner circumferential surface of the main ring body is spaced apart from an outer circumferential surface of the shaft housing by a radial distance (h).

5. An aircraft comprising a gas turbine engine having an exhaust duct assembly disposed in a low-pressure turbine portion to discharge an exhaust gas to the outside, wherein the exhaust duct assembly comprises:

a duct comprising an inlet through which the exhaust gas is introduced, an exhaust portion through which the exhaust gas is exhausted, and a mounting bore formed therethrough;

a duct housing in which the duct is disposed therein, and comprising a mounting hole into which the exhaust portion is inserted;

a shaft housing disposed inside the mounting bore of the duct, inserted into the duct housing so that a first end thereof faces the inlet of the duct, and having a driving axis of the low-pressure turbine portion disposed therein, the shaft housing having a second end opposite the first end and defining an axially facing annular seat around the driving axis; and a sealing portion having a ring shape, being coupled to the second end of the shaft housing, and maintaining airtightness between inner and outer sides of the shaft housing;

wherein the sealing portion has a main ring body and a plurality of mounting tabs projecting radially inwardly from an inner circumferential surface of the main ring body, the plurality of mounting tabs circumferentially spaced-apart around the driving axis to provide circumferentially interrupted points of contact with the axially facing annular seat of the shaft housing, and wherein bolts extend through the plurality of mounting tabs for bolting the sealing portion to the axially facing annular seat of the shaft housing.

6. The aircraft of claim 5, wherein the shaft housing comprises an annular protruding portion extending axially from the second end, the annular protruding portion having a radially outer diameter surface, and wherein the axially facing annular seat extends circumferentially around the annular protruding portion, the radially outer diameter surface of the annular protruding portion and the axially facing surface forming a step, and wherein the main ring body of the sealing portion is spaced radially outwardly from the radially outer diameter surface of the annular protruding portion.

7. The aircraft of claim 6, wherein the sealing portion comprises a plurality of sealing guides arranged side by side in a longitudinal direction of the main ring body on an outer circumferential surface of the main ring body, each of the sealing guides extending circumferentially around the driving axis.

8. The exhaust duct assembly of claim 7, wherein the inner circumferential surface of the main ring body is spaced apart from an outer circumferential surface of the shaft housing by a radial distance (h).

* * * * *